(12) United States Patent
Sokolov et al.

(10) Patent No.: US 6,581,077 B2
(45) Date of Patent: Jun. 17, 2003

(54) METHOD AND APPARATUS FOR STORING SHORT-LIVED OBJECTS IN A VIRTUAL MACHINE

(75) Inventors: Stepan Sokolov, Fremont, CA (US); David Wallman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 240 days.

(21) Appl. No.: 09/736,645

(22) Filed: Dec. 12, 2000

(65) Prior Publication Data

US 2002/0116409 A1 Aug. 22, 2002

(51) Int. Cl.$^7$ .............................................. G06F 17/30
(52) U.S. Cl. ........................................ 707/206; 717/148
(58) Field of Search .......................... 707/206; 711/170, 711/171; 717/148

(56) References Cited

U.S. PATENT DOCUMENTS

| | | | | |
|---|---|---|---|---|
| 2,655,091 A | * | 10/1953 | Geiger ........................ 454/158 |
| 3,524,398 A | * | 8/1970 | Winfrey | |
| 3,941,034 A | * | 3/1976 | Helwig et al. | |
| 4,768,423 A | * | 9/1988 | Boeger | |
| 5,136,706 A | * | 8/1992 | Courts ........................ 707/206 |
| 6,068,675 A | * | 5/2000 | Tsuda et al. ................ 55/685.3 |
| 6,125,434 A | * | 9/2000 | Willard et al. ............... 707/206 |
| 6,136,055 A | * | 10/2000 | Stanek ......................... 55/357 |
| 6,200,465 B1 | * | 3/2001 | Carawan et al. .............. 15/357 |
| 6,434,575 B1 | * | 8/2002 | Berry et al. ................. 707/206 |
| 6,446,257 B1 | * | 9/2002 | Pradhan et al. ............. 707/206 |
| 6,457,111 B1 | * | 9/2002 | Howard et al. ............. 707/206 |

OTHER PUBLICATIONS

Yuping Ding; Xining Li Titled "Cache performance of chronological garbage collection" IEEE Canadian Conference on , vol.: 1 , May 24–28, 1998 pp.: 1–4 vol. 1.*

* cited by examiner

*Primary Examiner*—Diane D. Mizrahi
*Assistant Examiner*—Shireen I Solaiman
(74) *Attorney, Agent, or Firm*—Park, Vaughan & Fleming LLP; Edward J. Grundler

(57) ABSTRACT

One embodiment of the mechanism provides a system for storing short-lived objects defined within an object-oriented programming system. These short-lived objects are created in a virtual machine used for executing platform-independent code and are ordinarily created during normal operation of the virtual machine. The system works by allocating a storage area reserved for short-lived objects that uses a method of garbage collection optimized for short-lived objects. After the storage area is allocated, the system receives requests to create an object. The system then determines if the object is a short-lived object by referring to a table of short-lived objects. If the object is a short-lived object, it is created and placed in the reserved storage area.

18 Claims, 2 Drawing Sheets

METHOD AND APPARATUS FOR STORING SHORT-LIVED OBJECTS IN A VIRTUAL MACHINE

RELATED APPLICATION

The subject matter of this application is related to the subject matter in a co-pending non-provisional application by the same inventors as the instant application and filed on the same day as the instant application entitled, "METHOD AND APPARATUS FOR STORING LONG-LIVED OBJECTS IN A VIRTUAL MACHINE," having Ser. No. 09/736,655, and filing date Dec. 12, 2000.

BACKGROUND

1. Field of the Invention

The present invention relates to objects defined within an object-oriented computer programming system. More specifically, the present invention relates to a method and apparatus for storing short-lived objects within an object-oriented computer programming system.

2. Related Art

The recent proliferation of ever smaller and more capable computing devices has lead to the use of platform-independent programming languages on these smaller devices. Platform-independent programming languages facilitate the creation of programs that can be compiled to a set of platform-independent codes, which can be executed on a variety of computing devices. Many of these computing devices have a virtual machine (VM) containing an interpreter or just-in-time compiler to execute these platform-independent codes. The JAVA™ programming language is an example of a platform-independent programming language and JAVA bytecodes are an example of platform-independent codes.

The terms JAVA, JVM and JAVA VIRTUAL MACHINE are registered trademarks of SUN Microsystems, Inc. of Palo Alto, Calif.

Many VMs use an area of memory called a heap to store various objects. When an object in the heap is no longer needed, all references pointing to the object will have been deleted. However, the object continues to occupy space in the heap. In some VMs, a computer program called a garbage collector scans the heap and deletes objects that are not being referenced in order to reclaim unused space in the heap.

There are many implementations of garbage collectors, however, they all share some traits. Garbage collectors require resources of the computing device in order to operate. This uses storage space in the computing device and slows execution times of running programs. There have been many attempts to reduce the impact of garbage collection on executing programs. For instance, a garbage collector can be run in a separate execution thread. If the computing device has more than one processor, the separate execution thread can run on another processor, thereby reducing the impact on the main execution thread.

Another attempt to reduce the impact of garbage collection involves the use of so called "generational garbage collectors." These work by migrating long-lived objects to an area of the heap where garbage collection is performed less often and leaving short-lived objects in an area of the heap where garbage collection is performed more often and possibly performed using a different method.

Neither of these techniques, however, is well suited for small computing devices. Small computing devices have only one processor, therefore running a separate garbage collection thread causes the main program thread to be "swapped out" during garbage collection. Furthermore, generational garbage collectors require large amounts of storage space, which may not be available on a small computing device.

Moreover, many VMs generate a large number of objects that will remain active for only a very short period of time. For example, the JAVA runtime environment creates a large number of java.lang.StringBuffer objects, which remain available for only several instructions or, at most, during the lifetime of a single function of a program. These objects occupy a considerable portion of the normal heap and, as a result, cause the garbage collector to consume a considerable amount of processor time, even though these objects never remain in the heap for more than one cycle of the garbage collector.

As an example of how these short-lived objects are created, consider the following JAVA source code.

```
class StringBufferTst {
    Object x;
    public static void main(String[ ] args) {
        String s1="Hello ";
        String s2="StringBuffer";
        System.out.println(s1+s2);
    }
}
```

When compiled by a JAVA compiler, the JAVA source code is translated into the following series of bytecodes.

```
Method void main(java.lang.String[ ])
    0 ldc #2 <String "Hello ">
    2 astore_1
    3 ldc #3 <String "StringBuffer">
    5 astore_2
    6 getstatic #4 <Field java.io.Printstream out>
    9 new #5 <Class java.lang.StringBuffer>
    12 dup
    13 invokespecial #6 <Method java.lang.StringBuffer( )>
    16 aload_1
    17 invokevirtual #7 <Method java.lang.StringBuffer append(java.lang.String)>
    20 aload_2
    21 invokevirtual #7 <Method java.lang.StringBuffer append(java.lang.String)>
    24 invokevirtual #8 <Method java.lang.String toString( )>
    27 invokevirtual #9 <Method void println(java.lang.String)>
    30 return
```

Note that the object created by bytecode number 9 is short-lived. In fact, this object has no useful life after bytecode number 27.

What is needed is a system that eliminates the waste of resources caused by the garbage collector operating on objects that are usually deleted shortly after being created.

SUMMARY

One embodiment of the present invention provides a system for storing short-lived objects defined within an object-oriented programming system. These short-lived objects are created in a virtual machine used for executing platform-independent code and are ordinarily created during normal operation of the virtual machine. The system works by allocating a storage area reserved for short-lived objects that uses a method of garbage collection optimized for short-lived objects. After the storage area is allocated, the system receives requests to create an object. The system then determines if the object is a short-lived object by referring to a table of short-lived objects. If the object is a short-lived object, it is created and placed in the reserved storage area.

In one embodiment of the present invention, the reserved storage area is an area of a heap used by the virtual machine.

In one embodiment of the present invention, the remainder of the heap is subject to garbage collection using a method that is optimized for objects of ordinary life span.

In one embodiment of the present invention, the short-lived object is a transient string buffer object.

In one embodiment of the present invention, the transient string buffer object is a java.lang.StringBuffer object.

In one embodiment of the present invention, the storage area is organized into an array of objects.

In one embodiment of the present invention, an element of the array is sized to accommodate a largest short-lived object within the virtual machine.

In one embodiment of the present invention, the virtual machine is a JAVA VIRTUAL MACHINE.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
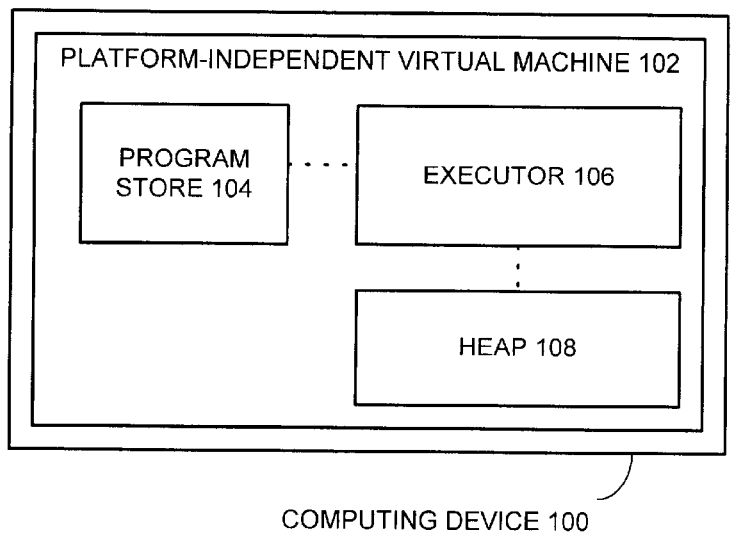
FIG. 1 illustrates computing device 100 in accordance with an embodiment of the present invention.

FIG. 1 illustrates computing device 100 in accordance with an embodiment of the present invention. Computing device 100 may include any type of computer system, including, but not limited to, a computer system based on a microprocessor, a mainframe computer, a digital signal processor, a personal organizer, a device controller, and a computational engine within an appliance.

Included within computing device 100 is platform-independent virtual machine 102. In one embodiment of the present invention, platform-independent virtual machine 102 is a JAVA VIRTUAL MACHINE. Platform-independent virtual machine 102 includes program store 104, executor 106 and heap 108.

Program store 104 stores and provides the instructions that executor 106 uses to perform operations directed by a program.

Executor 106 performs operations within platform-independent virtual machine 102 as directed by the program code stored in program store 104. In one embodiment of the present invention, executor 106 is implemented as an interpreter, which interprets the platform-independent code within program store 104.

Heap 108 stores objects created within an object-oriented programming system. These objects include short-lived objects, which are created during operation of platform-independent virtual machine 102, and which never remain in heap 108 for more than one cycle of a garbage collector.

Platform-Independent Virtual Machine

Figure 2:
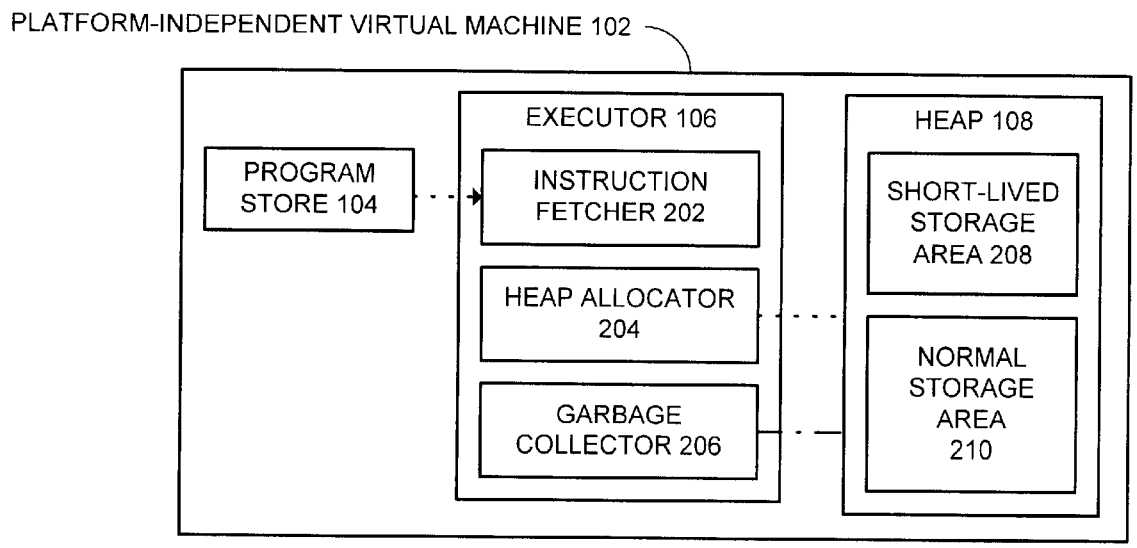
FIG. 2 illustrates platform-independent virtual machine 102 in accordance with an embodiment of the present invention.

FIG. 2 illustrates platform-independent virtual machine 102 in accordance with an embodiment of the present invention. As described above, platform-independent virtual machine 102 includes executor 106. Executor 106 includes instruction fetcher 202, heap allocator 204, and garbage collector 206.

Platform-independent virtual machine 102 also includes heap 108 as described above. Heap 108 includes short-lived storage area 208 and normal storage area 210.

During initialization of platform-independent virtual machine 102, instruction fetcher 202 fetches instructions from program store 104 for execution by executor 106. If the fetched instruction is an instruction to create a new object, heap allocator 204 determines if the object is a short-lived object by consulting a table (not shown) of short-lived objects. Alternatively, heap allocator 204 can consult an attribute of the class being allocated to determine if the object is a short-lived object, wherein the attribute is preset to indicate whether all objects of the class are normal-lived objects or short-lived objects. Note that a code profiler can be used to analyze existing code to identify short-lived objects. For example, use of a code profiler on existing JAVA code has shown that string buffer objects created during operation of the VM, such as java.lang.StringBuffer objects, usually remain active for a few instructions or, at most, during the lifetime of a single function within a program. If the object is a short-lived object, heap allocator 204 places the object in short-lived storage area 208. If the object is not a short-lived object, heap allocator 204 places the object in normal storage area 210.

When used to perform garbage collection on short-lived storage area 208, garbage collector 206 can be configured to use a different garbage collection method than the method used for normal storage area 210.

Short-lived storage area 208 can, optionally, be configured as an array of objects such that garbage collector 206 can reclaim storage space more easily for transient objects that will not remain active for long periods of time. The elements of this array are normally allocated to accommodate the largest size of a transient object. This allows allocation and garbage collection without the need for garbage collector 206 to compact the short-lived area of heap 108. Instead, objects remain allocated in the same element of the array, and are marked as being active by garbage collector 206.

During operation, garbage collector 206 also periodically visits each object within normal storage area 210 to determine if the object is still referenced from within the system. If there are no references to an object within normal storage area 210, garbage collector 206 deletes the object and reclaims its memory space within normal storage area 210. Garbage collector 206 can also relocate objects within normal storage area 210 so that normal storage area 210 may be used more efficiently.

Creating Short-Lived Objects

Figure 3:
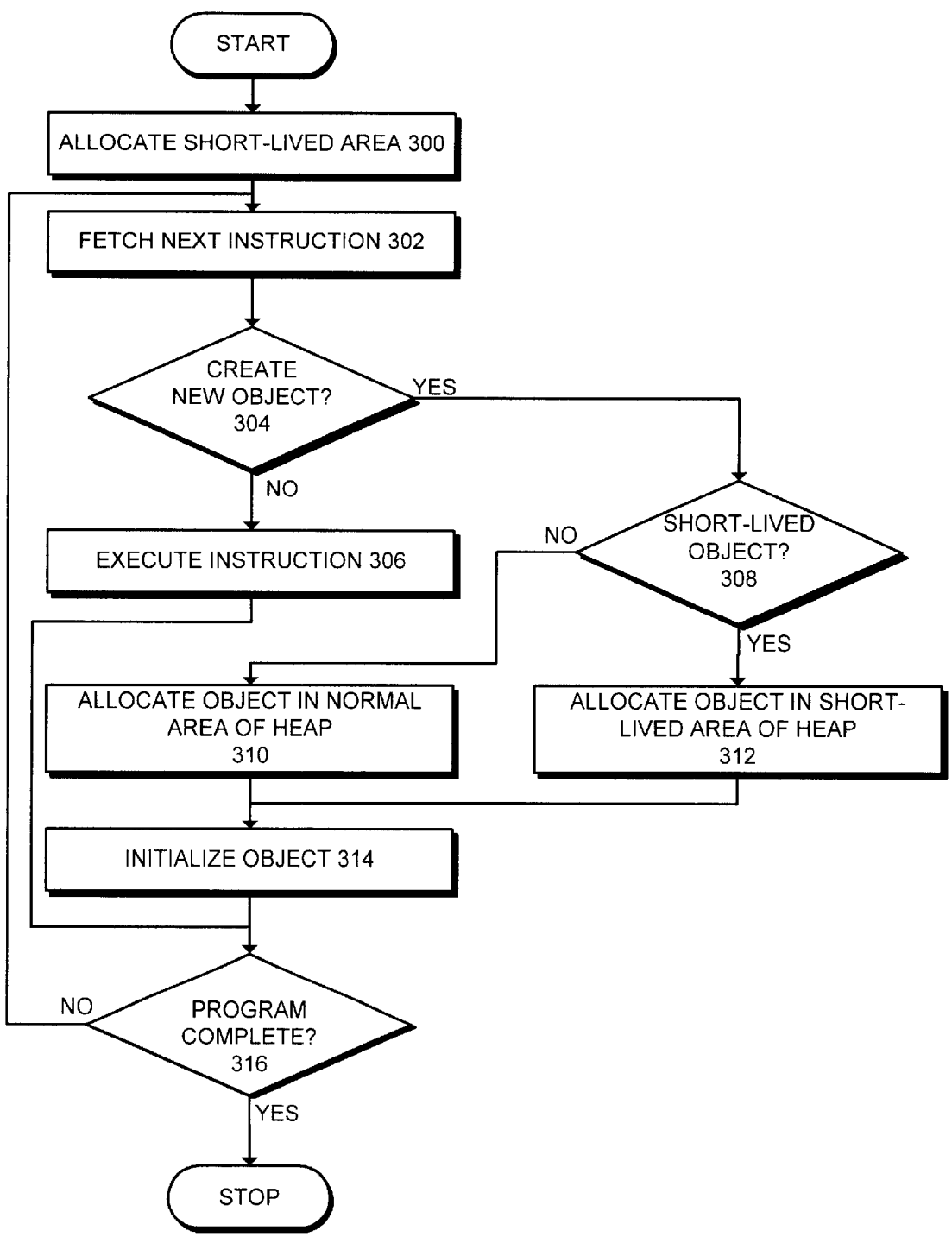
FIG. 3 is a flowchart illustrating the process of creating short-lived objects during operation of a virtual machine in accordance with an embodiment of the present invention.

FIG. 3 is a flowchart illustrating the process of creating short-lived objects during operation of a virtual machine in accordance with an embodiment of the present invention. The system starts when executor 106 creates short-lived storage area 208 within heap 108 (step 300).

Next, instruction fetcher 202 fetches an instruction from program store 104 (step 302). Executor 106 determines if the instruction creates a new object (step 304).

If the instruction creates a new object, heap allocator 204 determines if the object is a short-lived object by referring to a table of short-lived objects (step 308). In one embodiment of the present invention, the process of creating the new object and determining if the object is a short-lived object is performed by the "new" function of heap allocator 204, which is called to create objects. If the object is a short-lived object, heap allocator 204 allocates the object in short-lived storage area 208 of heap 108 (step 312). If the object is not a short-lived object, heap allocator 204 allocates the object in normal storage area 210 of heap 108 (step 310).

After heap allocator 204 has allocated the object in either of steps 312 or 310, executor 106 initializes the object (step 314).

If the instruction does not create a new object at step 304, executor 106 executes the instruction (step 306).

After initializing the object at step 314, or after executing the instruction at step 306, executor 106 determines if the program is complete (step 316). If the program is not complete, executor 106 returns to step 302 to fetch another instruction and to continue executing the program. Otherwise, the program is complete.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for storing short-lived objects defined within an object-oriented programming system in a virtual machine for executing platform-independent code, wherein short-lived objects are created during operation of the virtual machine, the method comprising;

allocating a storage area reserved for short-lived objects, wherein the storage area is subject to garbage collection using a first garbage collection method optimized for short-lived objects;

receiving a request to create an object;

determining if the object is identified in a table of short-lived objects; and if the object is identified as a short-lived object, creating the short-lived object, and placing the short-lived object in the storage area;

wherein the storage area is an area of a heap used by the virtual machine;

wherein a remainder of the heap is subject to garbage collection using a second garbage collection method optimized for ordinary-lived objects.

2. The method of claim 1, wherein the short-lived object is a transient string buffer object.

3. The method of claim 2, wherein the transient string buffer object is a java.lang.StringBuffer object.

4. The method of claim 1, wherein the storage area is organized into an array of objects.

5. The method of claim 4, wherein an element of the array is sized to accommodate a largest short-lived object within the virtual machine.

6. The method of claim 1, wherein the virtual machine is a JAVA VIRTUAL MACHINE.

7. A computer-readable storage medium storing instructions that when executed by a computer cause the computer to perform a method for storing short-lived objects defined within an object-oriented programming system in a virtual machine for executing platform-independent code, wherein short-lived objects are created during operation of the virtual machine, the method comprising;

allocating a storage area reserved for short-lived objects, wherein the storage area is subject to garbage collection using a first garbage collection method optimized for short-lived objects;

receiving a request to create an object;

determining if the object is identified in a table of short-lived objects; and if the object is identified as a short-lived object, creating the short-lived object, and placing the short-lived object in the storage area;

wherein the storage area is an area of a heap used by the virtual machine;

wherein a remainder of the heap is subject to garbage collection using a second garbage collection method optimized for ordinary-lived objects.

8. The computer-readable storage medium of claim 7, wherein the short-lived object is a transient string buffer object.

9. The computer-readable storage medium of claim 8, wherein the transient string buffer object is a java.lang.StringBuffer object.

10. The computer-readable storage medium of claim 7, wherein the storage area is organized into an array of objects.

11. The computer-readable storage medium of claim 10, wherein an element of the array is sized to accommodate a largest short-lived object within the virtual machine.

12. The computer-readable storage medium of claim 7, wherein the virtual machine is a JAVA VIRTUAL MACHINE.

13. An apparatus that facilitates storing short-lived objects defined within an object-oriented programming system in a virtual machine for executing platform-independent code, wherein short-lived objects are created during operation of the virtual machine, the apparatus comprising;

an allocating mechanism that is configured to allocate a storage area reserved for short-lived objects, wherein the storage area is subject to garbage collection using a first garbage collection method optimized for short-lived objects;

a receiving mechanism that is configured to receive a request to create an object;

a determining mechanism that is configured to determine if the object is identified in a table of short-lived objects;

a creating mechanism that is configured to create a short-lived object; and a placing mechanism that is configured to place the short-lived object in the storage area;

wherein the storage area is an area of a heap used by the virtual machine;

wherein a remainder of the heap is subject to garbage collection using a second garbage collection method optimized for ordinary-lived objects.

14. The apparatus of claim 13, wherein the short-lived object is a transient string buffer object.

15. The apparatus of claim 14, wherein the transient string buffer object is a java.lang.StringBuffer object.

16. The apparatus of claim 13, wherein the storage area is organized into an array of objects.

17. The apparatus of claim 16, wherein an element of the array is sized to accommodate a largest short-lived object within the virtual machine.

18. The apparatus of claim 13, wherein the virtual machine is a JAVA VIRTUAL MACHINE.

* * * * *